US012630666B2

(12) United States Patent　　　(10) Patent No.: US 12,630,666 B2

Fujishita et al.　　　(45) Date of Patent: May 19, 2026

(54) URETHANE RESIN COMPOSITION, FOAMED URETHANE SHEET, AND SYNTHETIC LEATHER

(71) Applicant: DIC Corporation, Tokyo (JP)

(72) Inventors: Norie Fujishita, Takaishi (JP); Ryo Maeda, Takaishi (JP)

(73) Assignee: DIC Corporation, Tokyo (JP)

( * ) Notice: Subject to any disclaimer, the term of this patent is extended or adjusted under 35 U.S.C. 154(b) by 1129 days.

(21) Appl. No.: 17/602,405

(22) PCT Filed: Mar. 24, 2020

(86) PCT No.: PCT/JP2020/012895

§ 371 (c)(1),
(2) Date: Oct. 8, 2021

(87) PCT Pub. No.: WO2020/217813

PCT Pub. Date: Oct. 29, 2020

(65) Prior Publication Data

US 2022/0220250 A1　　Jul. 14, 2022

(30) Foreign Application Priority Data

Apr. 23, 2019　(JP) ................................. 2019-081872

(51) Int. Cl.

| | |
|---|---|
| *C08G 18/76* | (2006.01) |
| *C08G 18/44* | (2006.01) |
| *C08G 18/66* | (2006.01) |
| *C08J 9/30* | (2006.01) |
| *C08K 5/09* | (2006.01) |
| *C08G 101/00* | (2006.01) |

(52) U.S. Cl.

CPC ......... *C08G 18/7692* (2013.01); *C08G 18/44* (2013.01); *C08G 18/6674* (2013.01); *C08J 9/30* (2013.01); *C08K 5/09* (2013.01); *C08G 2101/00* (2013.01); *C08G 2110/0066* (2021.01); *C08J 2201/026* (2013.01); *C08J 2375/08* (2013.01); *C08J 2475/08* (2013.01)

(58) Field of Classification Search

CPC ............................ C08G 18/08; C08G 18/0823; C08G 18/0866; C08G 18/244; C08G 18/3206; C08G 18/348; C08G 18/4018; C08G 18/44; C08G 18/48; C08G 18/4854; C08G 18/664; C08G 18/6659; C08G 18/6674; C08G 18/6692; C08G 18/7671; C08G 18/7692

See application file for complete search history.

(56) References Cited

U.S. PATENT DOCUMENTS

| | | | |
|---|---|---|---|
| 2007/0249746 A1 | 10/2007 | Rische et al. | |
| 2008/0070999 A1 | 3/2008 | Mager et al. | |
| 2008/0299357 A1 | 12/2008 | Nakagawa et al. | |
| 2009/0148395 A1 | 6/2009 | Fugmann et al. | |
| 2013/0136913 A1 | 5/2013 | Chiyonobu et al. | |
| 2016/0208432 A1* | 7/2016 | Tetsui ................... | D06N 3/146 |
| 2018/0030650 A1 | 2/2018 | Tetsui | |

FOREIGN PATENT DOCUMENTS

| | | |
|---|---|---|
| CN | 101535359 A | 9/2009 |
| DE | 102007048080 A1 | 4/2009 |
| JP | 2000-345026 A | 12/2000 |
| JP | 2004-143641 A | 5/2004 |
| JP | 2005-239841 A | 9/2005 |
| JP | 2007-191810 A | 8/2007 |
| JP | 2019-112564 A | 7/2019 |
| KR | 20090024119 A | 3/2009 |
| WO | 2012/017724 A1 | 2/2012 |
| WO | 2016/140025 A1 | 9/2016 |

OTHER PUBLICATIONS

Supplementary European Search Report dated May 20, 2022, issued for European Patent Application No. 20795948.7.

Office Action dated Mar. 15, 2023, issued for Chinese Patent Application No. 202080029291.0 and English translation thereof.

* cited by examiner

*Primary Examiner* — John M Cooney

(74) *Attorney, Agent, or Firm* — Troutman Pepper Locke LLP; James E. Armstrong, IV

(57) ABSTRACT

In the present invention, there is provided an urethane resin composition containing an urethane resin (A), water (B), and a surfactant (C) having no aromatic ring, and having a hydrophobic portion having 10 or more carbon atoms, wherein the urethane resin composition has a carbonate structure (X) and an oxyalkylene structure (Y) derived from the urethane resin (A). Further, the present invention provides a foamed urethane sheet which is formed from the urethane resin composition, wherein the foamed urethane sheet has a density of 200 to 1,000 kg/m³. The urethane resin composition according to claim 1, wherein the mass ratio of the carbonate structure (X) to the oxyalkylene structure (Y) [X/Y] is in the range of from 10/90 to 90/10.

6 Claims, No Drawings

URETHANE RESIN COMPOSITION, FOAMED URETHANE SHEET, AND SYNTHETIC LEATHER

TECHNICAL FIELD

The present invention relates to an urethane resin composition, a foamed urethane sheet, and a synthetic leather.

BACKGROUND ART

Polyurethane resins have excellent mechanical strength and flexibility, and have been used in various applications, such as a coating agent and an adhesive. Especially, a solvent urethane resin containing dimethylformamide (DMF) has been widely used, but the use of DMF is more and more strictly regulated, and there is a pressing need for the development of environment-friendly products of urethane resin, such as weak solvent, aqueous solvent, or solvent-less products.

Among such products, aqueous urethane (PUD) having an urethane resin dispersed in water is being most energetically studied. In the use of the aqueous urethane in various applications, there are many needs for forming a foamed material from the aqueous urethane for improving the hand feeling and the like. With respect to the method for forming a foamed material from aqueous urethane, studies are made on, for example, a method of incorporating microcapsules into the aqueous urethane, and a mechanical foaming method of dispersing a gas, such as carbon dioxide, in a PUD blend (see, for example, PTL 1). However, the method of incorporating microcapsules has problems in that the obtained foamed material has poor hand feeling, and in that expansion of the microcapsules causes poor smoothness. Further, in the method of dispersing a gas, the bubbles generated in the PUD blend, for example, disappear during the process of producing a foamed material, and hence it is difficult to control the size of bubbles and the like, making it difficult to stably obtain a foamed material having excellent hand feeling.

Further, recently, the foamed material is strongly needed to have, in addition to excellent hand feeling, a resistance to oleic acid contained in human sebum and low-temperature flexing properties such that the material is durable when actually used at low temperatures, and these properties have a relationship that there is inevitably a trade-off between them, and thus it is difficult to satisfy all the required properties.

CITATION LIST

Patent Literature

PTL 1: JP-A-2007-191810

SUMMARY OF INVENTION

Technical Problem

A task to be achieved by the present invention is to provide an urethane resin composition which uses an urethane resin composition containing water, and which exhibits excellent hand feeling, resistance to oleic acid (oleic acid resistance), and low-temperature flexing properties.

Solution to Problem

In the present invention, there is provided an urethane resin composition containing an urethane resin (A), water (B), and a surfactant (C) having no aromatic ring, and having a hydrophobic portion having 10 or more carbon atoms, wherein the urethane resin composition has a carbonate structure (X) and an oxyalkylene structure (Y) derived from the urethane resin (A).

Further, the invention provides a foamed urethane sheet which is formed from the urethane resin composition, wherein the foamed urethane sheet has a density of 200 to 1,000 kg/m$^3$. Further, the invention provides a synthetic leather having at least a substrate (i) and a polyurethane layer (ii), wherein the polyurethane layer (ii) is formed from the foamed urethane sheet.

Advantageous Effects of Invention

The urethane resin composition of the invention uses an urethane resin composition containing water, and exhibits excellent hand feeling, oleic acid resistance, and low-temperature flexing properties.

DESCRIPTION OF EMBODIMENTS

The urethane resin composition of the invention contains an urethane resin (A), water (B), and a surfactant (C) having no aromatic ring, and having a hydrophobic portion having 10 or more carbon atoms, and has a carbonate structure (X) and an oxyalkylene structure (Y) derived from the urethane resin (A).

The urethane resin (A) can be, for example, dispersed in the below-mentioned water (B), and there can be used, for example, an urethane resin having a hydrophilic group, such as an anionic group, a cationic group, or a nonionic group; or an urethane resin forcibly dispersed in the water (B) using an emulsifying agent. These urethane resins (A) may be used individually or in combination. Among these, in view of the production stability, an urethane resin having a hydrophilic group is preferably used, and an urethane resin having an anionic group is more preferred.

As a method for obtaining the urethane resin having an anionic group, for example, there can be mentioned a method using at least one compound selected from the group consisting of a glycol compound having a carboxyl group and a compound having a sulfonyl group as a raw material.

As the glycol compound having a carboxyl group, for example, 2,2-dimethylolpropionic acid, 2,2-dimethylolbutanoic acid, 2,2-dimethylolbutyric acid, 2,2-dimethylolpropionic acid, or 2,2-valeric acid can be used. These compounds may be used individually or in combination.

As the compound having a sulfonyl group, for example, 3,4-diaminobutanesulfonic acid, 3,6-diamino-2-toluenesulfonic acid, 2,6-diaminobenzenesulfonic acid, or N-(2-aminoethyl)-2-aminoethylsulfonic acid can be used. These compounds may be used individually or in combination.

From the viewpoint of achieving still further excellent water dispersion stability, the amount of the raw materials used for producing the urethane resin having an anionic group is preferably in the range of from 0.1 to 4.8% by mass, more preferably in the range of from 0.5 to 4% by mass, further preferably in the range of from 1 to 3% by mass, based on the total mass of the raw materials of the urethane resin (A).

A part of or all of the carboxyl group and sulfonyl group may be neutralized by a basic compound in the urethane resin composition. As the basic compound, for example, there can be used ammonia; an organic amine, such as triethylamine, pyridine, or morpholine; an alkanolamine, such as monoethanolamine or dimethylethanolamine; or a metal basic compound containing sodium, potassium, lithium, calcium, or the like.

As a method for obtaining the urethane resin having a cationic group, for example, there can be mentioned a method using one or two or more compounds having an amino group as a raw material.

As the compound having an amino group, for example, there can be used a compound having a primary or secondary amino group, such as triethylenetetramine or diethylenetriamine; or a compound having a tertiary amino group, e.g., an N-alkyldialkanolamine, such as N-methyldiethanolamine or N-ethyldiethanolamine, or an N-alkyldiaminoalkylamine, such as N-methyldiaminoethylamine or N-ethyldiaminoethylamine. These compounds may be used individually or in combination.

By virtue of having a carbonate structure (X) and an oxyalkylene structure (Y) derived from the urethane resin (A), the urethane resin composition of the invention can achieve excellent oleic acid resistance and low-temperature flexing properties. The carbonate structure (X) and the oxyalkylene structure (Y) may be supplied from one type of urethane resin (A), or may be supplied separately from two or more types of urethane resins (A). The carbonate structure (X) [O—CO—O] is derived from a below-mentioned polycarbonate polyol (a2-1), and the oxyalkylene structure (Y) [O—CH$_2$—CH$_2$] is derived from a below-mentioned polyether polyol (a2-2).

From the viewpoint of achieving both high-level oleic acid resistance and high-level low-temperature flexing properties while maintaining excellent hand feeling, the mass ratio of the carbonate structure (X) to the oxyalkylene structure (Y) [X/Y] is preferably in the range of from 10/90 to 90/10, more preferably in the range of from 10/90 to 60/40.

Further, when the carbonate structure (X) and the oxyalkylene structure (Y) are supplied from one type of urethane resin (A), the mass ratio [X/Y] is preferably in the range of from 10/90 to 90/10, more preferably in the range of from 10/90 to 60/40.

Further, when the carbonate structure (X) and the oxyalkylene structure (Y) are supplied separately from two or more types of urethane resins (A), the mass ratio [X/Y] is preferably in the range of from 10/90 to 90/10, more preferably in the range of from 10/90 to 60/40. In this case, the mass of each of the carbonate structure (X) and the oxyalkylene structure (Y) means the total mass supplied from two or more types of urethane resins (A).

From the viewpoint of achieving still further excellent low-temperature flexing properties, it is preferred that the carbonate structure (X) and the oxyalkylene structure (Y) are supplied from one type of urethane resin (A).

As the urethane resin (A), specifically, for example, there can be used a reaction product of a polyisocyanate (a1), a polyol (a2), and the raw materials used for producing the above-mentioned urethane resin having a hydrophilic group.

As the polyisocyanate (a1), for example, there can be used an aromatic polyisocyanate, such as phenylene diisocyanate, toluene diisocyanate, diphenylmethane diisocyanate, xylylene diisocyanate, naphthalene diisocyanate, polymethylene polyphenyl polyisocyanate, or carbodiimidated diphenylmethane polyisocyanate; or an aliphatic or alicyclic polyisocyanate, such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, dimer acid diisocyanate, or norbornene diisocyanate. These polyisocyanates may be used individually or in combination.

From the viewpoint of the production stability and mechanical physical properties of the obtained film, the amount of the polyisocyanate (a1) used is preferably in the range of from 5 to 40% by mass, more preferably in the range of from 10 to 30% by mass, based on the total mass of the raw materials of the urethane resin (A).

With respect to the polyol (a2), a polycarbonate polyol (a2-1) and a polyether polyol (a2-2) are essential materials. Further, in addition to these materials, for example, a polyester polyol, a polyacrylic polyol, or a polybutadiene polyol can be used. These polyols may be used individually or in combination.

As the polycarbonate polyol (a2-1), for example, a reaction product of a carbonate and/or phosgene and a compound having two or more hydroxyl groups can be used.

As the carbonate, for example, dimethyl carbonate, diethyl carbonate, diphenyl carbonate, ethylene carbonate, or propylene carbonate can be used. These compounds may be used individually or in combination.

As the compound having two or more hydroxyl groups, for example, there can be used ethylene glycol, propylene glycol, 1,3-propanediol, 1,4-butanediol, 1,3-butanediol, 1,2-butanediol, 2-methyl-1,3-propanediol, 1,5-pentanediol, neopentyl glycol, 1,6-hexanediol, 1,5-hexanediol, 3-methyl-1,5-pentanediol, 1,7-heptanediol, 1,8-octanediol, 1,9-nonanediol, 1,8-nonanediol, 2-ethyl-2-butyl-1,3-propanediol, 1,10-decanediol, 1,12-dodecanediol, 1,4-cyclohexanedimethanol, 1,3-cyclohexanedimethanol, trimethylolpropane, trimethylolethane, or glycerol. These compounds may be used individually or in combination.

As the polyether polyol (a2-2), there can be used a polyoxyalkylene polyol; or a polyether polyol obtained by subjecting a cyclic ether, such as an alkylene oxide, to ring-opening polymerization using one type of or two or more types of compounds having two or more active hydrogen atoms as an initiator, or the like.

As the polyoxyalkylene polyol, for example, there can be used polyoxyethylene glycol, polyoxypropylene glycol, polyoxytetramethylene glycol, polyoxyethylene polyoxypropylene glycol, polyoxyethylene polyoxytetramethylene glycol, or polyoxypropylene polyoxytetramethylene glycol. Of these, from the viewpoint of achieving still further excellent low-temperature flexing properties, polyoxypropylene glycol and/or polyoxytetramethylene glycol is preferred, and polyoxytetramethylene glycol is more preferred.

The cyclic ether preferably has 2 to 10 carbon atoms, more preferably 2 to 6 carbon atoms, further preferably 2 to 4 carbon atoms. The hydrogen atom contained in the cyclic ether may be replaced by a halogen atom. With respect to the cyclic ether, one type of or two or more types of cyclic ethers can be used, and, for example, ethylene oxide, propylene oxide, 1,2-butylene oxide, 2,3-butylene oxide, styrene oxide, epichlorohydrin, tetrahydrofuran, or an alkylated tetrahydrofuran can be used.

With respect to the initiator, one type of or two or more types of initiators can be used, and, for example, there can be used a compound having two active hydrogen atoms, such as ethylene glycol, diethylene glycol, propylene glycol, trimethylene glycol, 1,3-butanediol, 1,4-butanediol, 1,6-hexanediol, neopentyl glycol, or water; or a compound having three or more active hydrogen atoms, such as glycerol, diglycerol, trimethylolethane, trimethylolpropane, hexanetriol, monoethanolamine, diethanolamine, triethanolamine, ethylenediamine, pentaerythritol, or saccharide.

Further, with respect to the polyether polyol (a2-2), any polyether polyol can be used as long as it contains the oxyalkylene structure (Y), and a polyether polyester polyol having an ester linkage introduced thereinto may be used.

From the viewpoint of the mechanical strength of the obtained film, the polyol (a2) preferably has a number average molecular weight in the range of from 500 to 8,000, more preferably in the range of from 800 to 4,000. The number average molecular weight of the polyol (a2) indicates a value as measured by a gel permeation column chromatography (GPC) method.

The polyol (a2) and a chain extender (a2') having a number average molecular weight of 50 to 450 may be used in combination if necessary. As the chain extender (a2'), for example, there can be used a chain extender having a hydroxyl group, such as ethylene glycol, diethylene glycol, triethylene glycol, propylene glycol, dipropylene glycol, 1,3-propanediol, 1,3-butanediol, 1,4-butanediol, hexamethylene glycol, saccharose, methylene glycol, glycerol, sorbitol, bisphenol A, 4,4'-dihydroxydiphenyl, 4,4'-dihydroxydiphenyl ether, or trimethylolpropane; or a chain extender having an amino group, such as ethylenediamine, 1,2-propanediamine, 1,6-hexamethylenediamine, piperazine, 2,5-dimethylpiperazine, isophoronediamine, 1,2-cyclohexanediamine, 1,3-cyclohexanediamine, 1,4-cyclohexanediamine, 4,4'-dicyclohexylmethanediamine, 3,3'-dimethyl-4,4'-dicyclohexylmethanediamine, 1,4-cyclohexanediamine, or hydrazine. These chain extenders may be used individually or in combination.

When the chain extender (a2') is used, from the viewpoint of easily controlling the flow starting temperature of the obtained urethane resin (A) and achieving still further excellent tensile strength, the amount of the chain extender (a2') used is preferably in the range of from 0.5 to 10% by mass, more preferably in the range of from 1 to 5% by mass, further preferably in the range of from 1.5 to 4% by mass, based on the total mass of the raw materials of the urethane resin (A).

As a method for producing the urethane resin (A), for example, there can be mentioned a method in which all the polyol (a2), the raw materials used for producing the urethane resin having a hydrophilic group, the chain extender (a2'), and the polyisocyanate (a1) are charged and subjected to reaction. The reaction in the above method can be conducted, for example, at 50 to 100° C. for 3 to 10 hours.

In producing the urethane resin (A), the molar ratio of the isocyanate group of the polyisocyanate (a1) to the total of the hydroxyl group of the polyol (a2), the hydroxyl group and amino group of the raw materials used for producing the urethane resin having a hydrophilic group, and the hydroxyl group and amino group of the chain extender (a2') [isocyanate group/(hydroxyl group and amino group)] is preferably in the range of from 0.8 to 1.2, more preferably in the range of from 0.9 to 1.1.

In producing the urethane resin (A), it is preferred that the isocyanate group remaining in the urethane resin (A) is deactivated. When deactivating the isocyanate group, an alcohol having one hydroxyl group, such as methanol, is preferably used. The amount of the alcohol used is preferably in the range of from 0.001 to 10 parts by mass, relative to 100 parts by mass of the urethane resin (A).

Further, when producing the urethane resin (A), an organic solvent may be used. As the organic solvent, for example, there can be used a ketone compound, such as acetone or methyl ethyl ketone; an ether compound, such as tetrahydrofuran or dioxane; an acetate compound, such as ethyl acetate or butyl acetate; a nitrile compound, such as acetonitrile; or an amide compound, such as dimethylformamide or N-methylpyrrolidone. These organic solvents may be used individually or in combination. It is preferred that the organic solvent is removed by a distillation method or the like when obtaining the final urethane resin composition.

From the viewpoint of stably retaining the foam (particularly in the drying step) generated in a below-mentioned foaming step so as to stably obtain a foamed urethane sheet having a density in the preferred range, the flow starting temperature of the urethane resin (A) is preferably 80° C. or higher, more preferably in the range of from 80 to 220° C.

As a method for controlling the flow starting temperature of the urethane resin (A), there can be mentioned a method of controlling the flow starting temperature by mainly a below-mentioned type of the polyol (a2) which is the raw material of the urethane resin (A), the amount of the chain extender (a2') used, and the type of the polyisocyanate (a1). As a method of controlling the flow starting temperature to be higher, for example, there can be mentioned the use of a highly crystalline polyol, such as polycarbonate polyol, as the polyol (a2), an increase of the amount of the chain extender (a2') used, and the use of a highly crystalline polyisocyanate, such as dicyclohexylmethane diisocyanate or 4,4'-diphenylmethane diisocyanate, as the polyisocyanate (a1). Further, as a method of controlling the flow starting temperature to be lower, for example, there can be mentioned the use of a poorly crystalline polyol, such as polyoxypropylene glycol, as the polyol (a2), a reduction of the amount of the chain extender (a2') used, and the use of a poorly crystalline polyisocyanate, such as isophorone diisocyanate or toluene diisocyanate, as the polyisocyanate (a1). Accordingly, the flow starting temperature of the urethane resin (A) can be controlled by appropriately selecting a method from these methods. A method for measuring the flow starting temperature of the urethane resin (A) is described in the Examples shown below.

When an urethane resin having an anionic group is used as the urethane resin (A), from the viewpoint of easily controlling the flow starting temperature and achieving still further excellent retention of foam and hand feeling, it is preferred to use an urethane resin (A-A-1) having an anionic group which is a reaction product of at least one polyisocyanate selected from the group consisting of 4,4'-diphenylmethane diisocyanate, toluene diisocyanate, cyclohexylmethane diisocyanate, and isophorone diisocyanate, the polyol (a2), a glycol compound having a carboxyl group, and a chain extender containing the chain extender (a2') having a hydroxyl group.

As the water (B), for example, ion-exchanged water or distilled water can be used. These waters may be used individually or in combination.

From the viewpoint of the water dispersion stability and working properties, the mass ratio of the urethane resin (A) to the water (B) [(A)/(B)] is preferably in the range of from 10/80 to 70/30, more preferably in the range of from 20/80 to 60/40.

With respect to the surfactant (C), for preventing the foam formed by foaming from disappearing (retention of foam) to achieve excellent hand feeling, it is necessary that the surfactant (C) having no aromatic ring, and having a hydrophobic portion having 10 or more carbon atoms be used.

As the surfactant (C), for example, a surfactant represented by the general formula (1) below; a fatty acid salt, a succinic acid salt, a sulfosuccinic acid salt, an octadecylsulfosuccinic acid salt, or a sulfosuccinic acid ester can be used. These surfactants may be used individually or in combination.

$$RCO_2^- X^+ \qquad (1)$$

Wherein, in the formula (1), R represents an alkyl group having a linear or branched structure having 10 to 20 carbon atoms, and X represents Na, K, $NH_4$, morpholine, ethanolamine, or triethanolamine.

With respect to the surfactant (C), among those mentioned above, the surfactant represented by the general formula (1) above is preferably used because it has still further excellent retention of foam, and the surfactant having a linear alkyl group having 13 to 19 carbon atoms is more preferably used, and a stearic acid salt is further preferred.

From the viewpoint of obtaining still further excellent retention of foam, the amount of the surfactant (C) used is preferably in the range of from 0.01 to 10 parts by mass, more preferably in the range of from 0.1 to 5 parts by mass, relative to 100 parts by mass of the urethane resin (A) (=solids).

The urethane resin composition contains the above-mentioned urethane resin (A), water (B), and surfactant (C) as essential components, but may contain an additional additive if necessary.

With respect to the additional additive, for example, there can be used a crosslinking agent, a neutralizing agent, a thickener, an urethane-forming reaction catalyst, a filler, a pigment, a dye, a flame retardant, a leveling agent, an anti-blocking agent, and the like. These additives may be used individually or in combination.

The crosslinking agent is used for the purpose of improving the mechanical strength of the foamed urethane sheet and the like, and, for example, there can be used a polyisocyanate crosslinking agent, an epoxy crosslinking agent, a melamine crosslinking agent, or an oxazoline crosslinking agent. These crosslinking agents may be used individually or in combination. When using the crosslinking agent, the amount of the crosslinking agent used, for example, relative to 100 parts by mass of the urethane resin (A) (=solids), is preferably in the range of from 0.01 to 100 parts by mass, more preferably in the range of from 0.1 to 50 parts by mass, further preferably in the range of from 0.5 to 30 parts by mass, especially preferably in the range of from 1 to 10 parts by mass.

Next, a method for producing the foamed urethane sheet of the invention is described.

The foamed urethane sheet is produced by foaming the urethane resin composition to obtain a foamed liquid, applying the obtained foamed liquid to a substrate, and drying the applied liquid so as to obtain a preferred density.

As a method for foaming the urethane resin composition to obtain a foamed liquid, for example, there can be mentioned a method in which the urethane resin composition is manually stirred, and a method in which the urethane resin composition is stirred using a mixer, such as a mechanical mixer. As a method using a mixer, for example, there can be mentioned a method in which the urethane resin composition is stirred at 500 to 3,000 rpm for 10 seconds to 3 minutes. In this case, in view of easily controlling the density of the foamed urethane sheet to be in the preferred range, the foamed liquid obtained after foaming preferably has a volume 1.3 to 7 times, more preferably 1.2 to 2 times, further preferably 1.3 to 1.7 times the volume of the urethane resin composition before foaming.

As a method for applying the obtained foamed liquid to a substrate, such as release paper, for example, there can be mentioned a method using a roll coater, a knife coater, a comma coater, an applicator, or the like.

As a method for drying the applied material, for example, there can be mentioned a method in which the applied material is dried at a temperature of 60 to 130° C. for 30 seconds to 10 minutes.

The foamed urethane sheet obtained by the above-mentioned method has a thickness of, for example, 5 to 200 μm.

From the viewpoint of obtaining still further advantageous hand feeling and tensile strength, the density of the foamed urethane sheet is preferably 200 to 1,000 kg/m$^3$, more preferably in the range of from 300 to 900 kg/m$^3$, further preferably in the range of from 400 to 800 kg/m$^3$. The density of the foamed urethane sheet indicates a value determined by dividing the mass of the foamed urethane sheet by the volume of the sheet.

Next, the synthetic leather of the invention is described.

The synthetic leather of the invention is a synthetic leather having at least a substrate (i) and a polyurethane layer (ii), wherein the polyurethane layer (ii) is formed from the above-mentioned foamed urethane sheet.

As a method for producing the synthetic leather, for example, there can be mentioned:

(X) a method in which the urethane resin composition is foamed to obtain a foamed liquid, and the obtained foamed liquid is applied onto release paper, and dried, and bonded to the substrate (i), (Y) a method in which the urethane resin composition is foamed to obtain a foamed liquid, and the obtained foamed liquid is applied onto a skin layer formed on release paper, and dried, and bonded to the substrate (i), and (Z) a method in which the urethane resin composition is foamed to obtain a foamed liquid, and the obtained foamed liquid is applied onto the substrate (i), and dried, and, if necessary, a skin layer (iii) formed on release paper is bonded onto the resultant substrate.

As the substrate (i), for example, there can be used a fiber substrate, such as nonwoven fabric, woven fabric, or knitted fabric, each formed from a polyester fiber, a polyethylene fiber, a nylon fiber, an acrylic fiber, a polyurethane fiber, an acetate fiber, a rayon fiber, a polylactic acid fiber, cotton, linen, silk, wool, a glass fiber, a carbon fiber, a mixed fiber thereof, or the like; the above-mentioned nonwoven fabric which is impregnated with a resin, such as a polyurethane resin; the above-mentioned nonwoven fabric which has further formed thereon a porous layer; or a resin substrate, such as a thermoplastic urethane (TPU).

The polyurethane layer (ii) is formed from the above-mentioned foamed sheet, and, in view of obtaining a synthetic leather having both still further excellent hand feeling and peel strength, the polyurethane layer (ii) preferably has a density in the range of from 300 to 900 kg/m$^3$, more preferably in the range of from 400 to 800 kg/m$^3$. The density of the polyurethane layer (ii) indicates a value determined by dividing a value, which is obtained by subtracting the weight of the substrate (i) 10 cm square from the weight of the synthetic leather 10 cm square, by the thickness of the polyurethane layer (ii). The density of the polyurethane layer (ii) can be controlled by appropriately foaming the urethane resin composition.

The skin layer (iii) can be formed by a known method from a known material, and, for example, a solvent urethane resin, an aqueous urethane resin, a silicone resin, a polypropylene resin, a polyester resin, or the like can be used. In the case of particularly achieving soft hand feeling and excellent heat resistance and hydrolytic resistance, a polycarbonate urethane resin is preferably used. Further, for reducing the use of DMF to protect the environment, an aqueous polycarbonate urethane resin is more preferably used.

On the skin layer (iii), if necessary, a surface treatment layer (iv) may be formed for the purpose of improving the marring resistance and the like. The surface treatment layer (iv) can be formed by a known method from a known material.

As apparent from the above, by virtue of using the above-mentioned foamed urethane sheet having excellent hand feeling and tensile strength, the synthetic leather of the invention is advantageous not only in that it further has excellent peel strength, but also in that embossing having excellent design properties can be uniformly formed on the surface of the synthetic leather.

As a method for embossing the polyurethane layer (ii), for example, there can be mentioned a method in which release paper having formed thereon a design, such as an uneven pattern, is placed on the polyurethane layer (ii) of the synthetic leather, and subjected to hot pressing by a preheated roll or the like; and a method in which the polyurethane layer (ii) of the synthetic leather is subjected to hot pressing using a roll coater having formed thereon a design, such as an uneven pattern. In the hot pressing, a roll can be heated, for example, at 50 to 200° C.

EXAMPLES

Hereinbelow, the present invention will be described in more detail with reference to the following Examples.

[Synthesis Example 1] Preparation of Urethane Resin (A-1) Composition 1,000 Parts by mass of polycarbonate polyol (which is produced from 1,6-hexanediol as a raw material; number average molecular weight: 2,000), 17 parts by mass of 2,2-dimethylolpropionic acid, 47 parts by mass of ethylene glycol, and 344 parts by mass of diphenylmethane diisocyanate were subjected to reaction at 70° C. in the presence of 3,281 parts by mass of methyl ethyl ketone and 0.1 part by mass of tin(II) octylate until the solution viscosity reached 20,000 mPa·s, and then 3 parts by mass of methanol was added to terminate the reaction, obtaining a methyl ethyl ketone solution of an urethane resin. Into the obtained urethane resin solution were mixed 70 parts by mass of polyoxyethylene distyrenated phenyl ether (Hydrophile-Lipophile Balance (hereinafter, abbreviated to "HLB"): 14) and 13 parts by mass of triethylamine, and then 800 parts by mass of ion-exchanged water was added to the resultant mixture to cause phase reversal of emulsion, obtaining an emulsion having the urethane resin (A-1) dispersed in water.

Then, methyl ethyl ketone was distilled off from the emulsion to obtain an urethane resin composition containing the urethane resin (A-1) in an amount of 50% by mass.

[Synthesis Example 2] Preparation of Urethane Resin (A-2) Composition 1,000 Parts by mass of polyoxytetramethylene glycol (number average molecular weight: 2,000), 17 parts by mass of 2,2-dimethylolpropionic acid, 47 parts by mass of ethyl-ene glycol, and 344 parts by mass of MDI were subjected to reaction at 70° C. in the presence of 3,281 parts by mass of methyl ethyl ketone and 0.1 part by mass of tin(II) octylate until the solution viscosity reached 20,000 mPa·s, and then 3 parts by mass of methanol was added to terminate the reaction, obtaining a methyl ethyl ketone solution of an urethane resin. Into the obtained urethane resin solution were mixed 70 parts by mass of polyoxyethylene distyrenated phenyl ether (HLB: 14) and 13 parts by mass of triethylamine, and then 800 parts by mass of ion-exchanged water was added to the resultant mixture to cause phase reversal of emulsion, obtaining an emulsion having the urethane resin (A-2) dispersed in water.

Then, methyl ethyl ketone was distilled off from the emulsion to obtain an urethane resin composition containing the urethane resin (A-2) in an amount of 50% by mass.

[Synthesis Example 3] Preparation of Urethane Resin (A-3) Composition

300 Parts by mass of polycarbonate polyol (which is produced from 1,6-hexanediol as a raw material; number average molecular weight: 2,000), 700 parts by mass of polyoxytetramethylene glycol (number average molecular weight: 2,000), 17 parts by mass of 2,2-dimethylolpropionic acid, 47 parts by mass of ethylene glycol, and 344 parts by mass of MDI were subjected to reaction at 70° C. in the presence of 3,281 parts by mass of methyl ethyl ketone and 0.1 part by mass of tin(II) octylate until the solution viscosity reached 20,000 mPa·s, and then 3 parts by mass of methanol was added to terminate the reaction, obtaining a methyl ethyl ketone solution of an urethane resin. Into the obtained urethane resin solution were mixed 70 parts by mass of polyoxyethylene distyrenated phenyl ether (HLB: 14) and 13 parts by mass of triethylamine, and then 800 parts by mass of ion-exchanged water was added to the resultant mixture to cause phase reversal of emulsion, obtaining an emulsion having the urethane resin (A-3) dispersed in water.

Then, methyl ethyl ketone was distilled off from the emulsion to obtain an urethane resin composition containing the urethane resin (A-3) in an amount of 50% by mass.

[Synthesis Example 4] Preparation of Urethane Resin (A-4) Composition

500 Parts by mass of polycarbonate polyol (which is produced from 1,6-hexanediol as a raw material; number average molecular weight: 2,000), 500 parts by mass of polyoxytetramethylene glycol (number average molecular weight: 2,000), 17 parts by mass of 2,2-dimethylolpropionic acid, 47 parts by mass of ethylene glycol, and 344 parts by mass of MDI were subjected to reaction at 70° C. in the presence of 3,281 parts by mass of methyl ethyl ketone and 0.1 part by mass of tin(II) octylate until the solution viscosity reached 20,000 mPa·s, and then 3 parts by mass of methanol was added to terminate the reaction, obtaining a methyl ethyl ketone solution of an urethane resin. Into the obtained urethane resin solution were mixed 70 parts by mass of polyoxyethylene distyrenated phenyl ether (HLB: 14) and 13 parts by mass of triethylamine, and then 800 parts by mass of ion-exchanged water was added to the resultant mixture to cause phase reversal of emulsion, obtaining an emulsion having the urethane resin (A-4) dispersed in water.

Then, methyl ethyl ketone was distilled off from the emulsion to obtain an urethane resin composition containing the urethane resin (A-4) in an amount of 50% by mass.

Example 1

To 30 parts by mass of the urethane resin (A-1) composition obtained in Synthesis Example 1 and 70 parts by mass of the urethane resin (A-2) composition obtained in Synthesis Example 2 were added 2 parts by mass of a thickener ("Borchi Gel ALA", manufactured by Borchers GmbH), 0.5 part by mass of ammonium stearate, and 4 parts by mass of a crosslinking agent ("EPOCROS WS-700", manufactured by Nippon Shokubai Co., Ltd.), and the resultant mixture was foamed by stirring using a mechanical mixer at 2,000 rpm for one minute to obtain a foamed liquid having a volume 1.5 times the original volume.

The obtained foamed liquid was applied to release paper, and dried at 80° C. for 3 minutes and further at 120° C. for 2 minutes to produce a foamed urethane sheet.

Example 2

A foamed urethane sheet was obtained in substantially the same manner as in Example 1 except that the amount of the urethane resin (A-1) incorporated was changed to 50 parts by mass, and that the amount of the urethane resin (A-2) incorporated was changed to 50 parts by mass.

Example 3

A foamed urethane sheet was obtained in substantially the same manner as in Example 1 except that the amount of the urethane resin (A-1) incorporated was changed to 80 parts by mass, and that the amount of the urethane resin (A-2) incorporated was changed to 20 parts by mass.

Example 4

To 100 parts by mass of the urethane resin (A-3) composition obtained in Synthesis Example 3 were added 2 parts by mass of a thickener ("Borchi Gel ALA", manufactured by Borchers GmbH), 0.5 part by mass of ammonium stearate, and 4 parts by mass of a crosslinking agent ("EPOCROS WS-700", manufactured by Nippon Shokubai Co., Ltd.), and the resultant mixture was foamed by stirring using a mechanical mixer at 2,000 rpm for one minute to obtain a foamed liquid having a volume 1.5 times the original volume.

The obtained foamed liquid was applied to release paper, and dried at 80° C. for 3 minutes and further at 120° C. for 2 minutes to produce a foamed urethane sheet.

Example 5

To 100 parts by mass of the urethane resin (A-4) composition obtained in Synthesis Example 4 were added 2 parts by mass of a thickener ("Borchi Gel ALA", manufactured by Borchers GmbH), 0.5 part by mass of ammonium stearate, and 4 parts by mass of a crosslinking agent ("EPOCROS WS-700", manufactured by Nippon Shokubai Co., Ltd.), and the resultant mixture was foamed by stirring using a mechanical mixer at 2,000 rpm for one minute to obtain a foamed liquid having a volume 1.5 times the original volume.

The obtained foamed liquid was applied to release paper, and dried at 80° C. for 3 minutes and further at 120° C. for 2 minutes to produce a foamed urethane sheet.

Comparative Example 1

To 30 parts by mass of the urethane resin (A-1) composition obtained in Synthesis Example 1 and 70 parts by mass of the urethane resin (A-2) composition obtained in Synthesis Example 2 were added 2 parts by mass of a thickener ("Borchi Gel ALA", manufactured by Borchers GmbH), 1.5 parts by mass of sodium dodecylbenzenesulfonate, and 4 parts by mass of a crosslinking agent ("EPOCROS WS-700", manufactured by Nippon Shokubai Co., Ltd.), and the resultant mixture was foamed by stirring using a mechanical mixer at 2,000 rpm for one minute to obtain a foamed liquid having a volume 1.5 times the original volume.

The obtained foamed liquid was applied to release paper, and dried at 80° C. for 3 minutes and further at 120° C. for 2 minutes to produce a sheet.

Comparative Example 2

To 100 parts by mass of the urethane resin (A-1) composition obtained in Synthesis Example 1 were added 2 parts by mass of a thickener ("Borchi Gel ALA", manufactured by Borchers GmbH), 0.5 part by mass of ammonium stearate, and 4 parts by mass of a crosslinking agent ("EPOCROS WS-700", manufactured by Nippon Shokubai Co., Ltd.), and the resultant mixture was foamed by stirring using a mechanical mixer at 2,000 rpm for one minute to obtain a foamed liquid having a volume 1.5 times the original volume.

The obtained foamed liquid was applied to release paper, and dried at 80° C. for 3 minutes and further at 120° C. for 2 minutes to produce a foamed urethane sheet.

Comparative Example 3

To 100 parts by mass of the urethane resin (A-2) composition obtained in Synthesis Example 2 were added 2 parts by mass of a thickener ("Borchi Gel ALA", manufactured by Borchers GmbH), 0.5 part by mass of ammonium stearate, and 4 parts by mass of a crosslinking agent ("EPOCROS WS-700", manufactured by Nippon Shokubai Co., Ltd.), and the resultant mixture was foamed by stirring using a mechanical mixer at 2,000 rpm for one minute to obtain a foamed liquid having a volume 1.5 times the original volume.

The obtained foamed liquid was applied to release paper, and dried at 80° C. for 3 minutes and further at 120° C. for 2 minutes to produce a foamed urethane sheet.

[Method for Measuring a Number Average Molecular Weight]

The number average molecular weight of the polyol and the like used in the Synthesis Examples was measured by a gel permeation column chromatography (GPC) method under the conditions shown below.

Measuring apparatus: High-speed GPC apparatus ("HLC-8220GPC", manufactured by Tosoh Corp.)

Columns: The columns shown below, manufactured by Tosoh Corp., which are connected in series were used.

"TSKgel G5000" (7.8 mm I.D.×30 cm)×1
"TSKgel G4000" (7.8 mm I.D.×30 cm)×1
"TSKgel G3000" (7.8 mm I.D.×30 cm)×1
"TSKgel G2000" (7.8 mm I.D.×30 cm)×1

Detector: RI (differential refractometer)
Column temperature: 40° C.
Eluent: Tetrahydrofuran (THF)
Flow rate: 1.0 mL/minute
Sample amount per injection: 100 μL (tetrahydrofuran solution having a sample concentration of 0.4% by mass)

Standard sample: A calibration curve was prepared using the standard polystyrenes shown below.

(Standard Polystyrenes)

"TSKgel standard polystyrene A-500", manufactured by Tosoh Corp.

"TSKgel standard polystyrene A-1000", manufactured by Tosoh Corp.

"TSKgel standard polystyrene A-2500", manufactured by Tosoh Corp.

"TSKgel standard polystyrene A-5000", manufactured by Tosoh Corp.

"TSKgel standard polystyrene F-1", manufactured by Tosoh Corp.

"TSKgel standard polystyrene F-2", manufactured by Tosoh Corp.

"TSKgel standard polystyrene F-4", manufactured by Tosoh Corp.

"TSKgel standard polystyrene F-10", manufactured by Tosoh Corp.

"TSKgel standard polystyrene F-20", manufactured by Tosoh Corp.

"TSKgel standard polystyrene F-40", manufactured by Tosoh Corp.

"TSKgel standard polystyrene F-80", manufactured by Tosoh Corp.

"TSKgel standard polystyrene F-128", manufactured by Tosoh Corp.

"TSKgel standard polystyrene F-288", manufactured by Tosoh Corp.

"TSKgel standard polystyrene F-550", manufactured by Tosoh Corp.

[Method for Measuring a Flow Starting Temperature of Urethane Resin (A)]

The urethane resin composition obtained in the Synthesis Example was applied to release paper (thickness of the applied composition: 150 μm), and dried by means of a hot-air dryer at 70° C. for 4 minutes and further at 120° C. for 2 minutes to obtain a dried material. With respect to the obtained dried material, a flow starting temperature was measured using Flow Tester "CFT-500A", manufactured by Shimadzu Corporation (using a dice having a bore diameter of 1 mm and a length of 1 mm; load: 98 N; temperature increase rate: 3° C./minute).

[Evaluation Method for Hand Feeling]

The obtained foamed urethane sheet was touched by hands, and evaluated according to the following criteria.

"A": Excellent flexibility.

"B": Slight flexibility.

"C": Poor flexibility.

"D": Hard.

[Method for Oleic Acid Resistance]

The foamed urethane sheet obtained in each of the Examples and Comparative Examples was bonded to non-woven fabric to obtain a synthetic leather. The obtained synthetic leather was cut into a piece having a width of 50 mm and a length of 50 mm, which was used as a test specimen. The test specimen was immersed in oleic acid at 80° C. for 24 hours, and then removed from the oleic acid, and the oleic acid remaining on the surface of the specimen was gently wiped with a paper wiper. With respect to the test specimen before and after being immersed in oleic acid, a change of the appearance was visually observed, and evaluated according to the following criteria.

"T": No change in the appearance.

"F": The synthetic leather had expanded and/or deformed.

[Method for Low-Temperature Flexing Properties]

The foamed urethane sheet obtained in each of the Examples and Comparative Examples was bonded to non-woven fabric to obtain a synthetic leather. The obtained synthetic leather was subjected to flexing test (−30° C., 100 flexes/minute) using a flexometer ("Low-temperature Flexometer", manufactured by Yasuda Seiki Seisakusho, Ltd.), and the number of flexes until a crack was caused in the surface of the synthetic leather was measured, and evaluated according to the following criteria.

"A": 15,000 flexes or more

"B": 10,000 to less than 15,000 flexes

"C": Less than 10,000 flexes

TABLE 1

|  | Example 1 | Example 2 | Example 3 | Example 4 |
|---|---|---|---|---|
| Type of urethane resin (A) | (A-1) (A-2) | (A-1) (A-2) | (A-1) (A-2) | (A-3) |
| Mass ratio of carbonate structure (X) to oxyalkylene structure (Y) [X/Y] | 30/70 | 50/50 | 90/10 | 30/70 |
| Type of Surfactant (C) | Ammonium stearate | Ammonium stearate | Ammonium stearate | Ammonium stearate |
| Evaluation of hand feeling | T | T | T | T |
| Evaluation of oleic acid resistance | T | T | T | T |
| Evaluation of low-temperature flexing properties | A | A | B | A |

TABLE 2

|  | Example 5 | Comparative Example 1 | Comparative Example 2 | Comparative Example 3 |
|---|---|---|---|---|
| Type of urethane resin (A) | (A-4) | (A-1) (A-2) | (A-1) | (A-2) |
| Mass ratio of carbonate structure (X) to oxyalkylene structure (Y) [X/Y] | 50/50 | 30/70 | 100/0 | 0/100 |
| Type of Surfactant (C) | Ammonium stearate | Sodium dodecylben-zenesulfonate | Ammonium stearate | Ammonium stearate |
| Evaluation of hand feeling | T | F | T | T |
| Evaluation of oleic acid resistance | T | T | T | F |
| Evaluation of low-temperature flexing properties | A | A | C | A |

It was found that the urethane resin composition of the present invention had excellent hand feeling, oleic acid resistance, and low-temperature flexing properties.

On the other hand, in Comparative Example 1 which corresponds to an embodiment using, instead of the surfactant (C), sodium dodecylbenzenesulfonate that has an aromatic ring, the retention of foam was poor, and the hand feeling was hard and poor.

In Comparative Example 2 which corresponds to an embodiment using the urethane resin composition containing no oxyalkylene structure (Y), the low-temperature flexing properties were poor.

In Comparative Example 3 which corresponds to an embodiment using the urethane resin composition containing no carbonate structure (X), the oleic acid resistance was poor.

The invention claimed is:

1. A urethane resin composition containing a urethane resin (A), water (B), and a surfactant (C) having no aromatic ring, and having a hydrophobic portion having 10 or more carbon atoms, wherein:

the urethane resin composition has a carbonate structure (X) and an oxyalkylene structure (Y) derived from the urethane resin (A);

the urethane resin (A) has an anionic group;

the urethane resin (A) is a reaction product of a polyisocyanate (a1), a polyol (a2), a chain extender (a2') having a hydroxyl group, and at least one glycol compound having a carboxyl group;

the polyisocyanate (a1) contains 4,4'-diphenylmethane diisocyanate;

the polyol (a2) is a polycarbonate polyol (a2-1), a polyether polyol (a2-2), or a combination thereof;

the chain extender (a2') having a hydroxyl group is ethylene glycol, diethylene glycol, triethylene glycol, propylene glycol, dipropylene glycol, 1,3-propanediol, 1,3-butanediol, 1,4-butanediol, hexamethylene glycol, saccharose, methylene glycol, glycerol, sorbitol, bisphenol A, 4,4'-dihydroxydiphenyl, 4,4'-dihydroxydiphenyl ether, or trimethylolpropane; and the glycol compound having a carboxyl group is 2,2-dimethylolpropionic acid; and the mass ratio of the carbonate structure (X) to the oxyalkylene structure (Y) [X/Y] is in the range of from 10/90 to 90/10.

2. The urethane resin composition according to claim 1, wherein the surfactant (C) is a stearic acid salt.

3. A foamed urethane sheet which is formed from the urethane resin composition according to claim 1, wherein the foamed urethane sheet has a density of 200 to 1,000 kg/m³.

4. A synthetic leather having at least a substrate (i) and a polyurethane layer (ii), wherein the polyurethane layer (ii) is formed from the foamed urethane sheet according to claim 3.

5. A foamed urethane sheet which is formed from the urethane resin composition according to claim 2, wherein the foamed urethane sheet has a density of 200 to 1,000 kg/m³.

6. A synthetic leather having at least a substrate (i) and a polyurethane layer (ii), wherein the polyurethane layer (ii) is formed from the foamed urethane sheet according to claim 5.

* * * * *